United States Patent [19]
Aoyama

[11] Patent Number: 5,462,027
[45] Date of Patent: Oct. 31, 1995

[54] INDUCTION SYSTEM FOR ENGINE

[75] Inventor: Tateo Aoyama, Iwata, Japan

[73] Assignee: Yamaha Hatsudoki Kabushiki Kaisha, Iwata, Japan

[21] Appl. No.: 144,713

[22] Filed: Oct. 28, 1993

[30] Foreign Application Priority Data

Oct. 28, 1992 [JP] Japan .................. 4-311116
Oct. 28, 1992 [JP] Japan .................. 4-311117

[51] Int. Cl.⁶ ........................................ F02B 17/00
[52] U.S. Cl. ........................ 123/432; 123/193.5
[58] Field of Search .................... 123/432, 308, 123/90.27, 193.5, 193.3, 302, 65 VD

[56] References Cited

U.S. PATENT DOCUMENTS

| | | | |
|---|---|---|---|
| 4,819,591 | 4/1989 | Valentine | 123/90.27 |
| 5,009,200 | 4/1991 | van Basshuysen et al. | 123/432 |
| 5,031,586 | 7/1991 | Masuda et al. | 123/90.27 |
| 5,119,785 | 6/1992 | Saito et al. | 123/432 |
| 5,174,260 | 12/1992 | Nonogawa et al. | 123/432 |
| 5,205,244 | 4/1993 | Nakamura et al. | 123/432 |
| 5,230,312 | 7/1993 | Baika et al. | 123/65 VD |

*Primary Examiner*—Marguerite Macy
*Attorney, Agent, or Firm*—Knobbe, Martens, Olson & Bear

[57] ABSTRACT

A number of embodiments of cylinder head and intake port arrangements for multiple valve, internal combustion engines particularly those having three or more intake valves. The configuration promotes turbulence in the combustion chamber by inducing a tumble action even from the center intake valve seat. In addition, each of the valve seats and its associated flow passages are configured so as to provide optimum tuning for different engine speeds so as to improve the torque of the engine throughout its entire speed and load ranges and to provide good breathing efficiency throughout all engine speeds. Various porting and throttle and fuel injection systems are shown wherein siamesed intake passages are formed for at least two of the valve seats.

29 Claims, 7 Drawing Sheets

INDUCTION SYSTEM FOR ENGINE

BACKGROUND OF THE INVENTION

This invention relates to an induction system for an engine and more particularly to an improved high efficiency induction system for a multi-valve engine.

It is well known that it is possible to improve the breathing efficiency of an internal combustion engine by utilizing multiple intake valves. By using a greater number of valves per cylinder, it is possible to increase the flow area in a given space of the engine. For this reason, four valve per cylinder engines are very popular and five valve per cylinder engines, having three intake valves per cylinder, are also becoming very popular. When the number of intake valves is increased beyond two, several problems arise. One of these problems is insuring that the valve placement is such that the valves can open to a maximum height so as to permit good flow into the cylinder and, at the same time, to maintain a small combustion chamber volume so that the compression ratio for the engine can be kept high and so that undue quenching can be reduced. U.S. Pat. No. 4,660,529, now reissued as U.S. Pat. No. 33,787 is an example of how five valves per cylinder may be placed to provide optimum induction efficiency and high compression ratios.

It is an object of this invention to provide an improved five valve per cylinder, cylinder head and induction arrangement that will further improve the efficiency of such engines.

Although the use of multiple intake valves provides good high speed performance, such large valve areas and low flow resistance passages normally employed therewith tend to provide high power and high speed, but may have a torque curve that has too much emphasis on high end performance.

It is, therefore, a still further object of this invention to provide a multiple valve cylinder head and intake port arrangement wherein the induction system is tuned so as to provide a good torque curve throughout the entire engine speed and load ranges.

It is another object of this invention to provide an improved induction system for an engine embodying multiple intake valves, at least three in number, and wherein each intake valve and its associated induction system is tuned to provide optimum induction efficiency at a different speed range so as to improve the overall torque curve.

One problem that is particularly prevalent with three intake valve engines is that the center intake valve (the one furthest from a plane passing through the center of the cylinder bore axis), tends to be masked by the other intake valves and this can reduce the induction efficiency.

It is, therefore, a still further object of this invention to provide an improved induction system and valve placement for a multiple valve, at least three intake valves per cylinder, engine wherein all valves are capable of providing good induction efficiency.

In conjunction with improving engine performance, particularly at the lower speed ranges, it is desirable to promote turbulence in the combustion chamber. One type of turbulence is an action called "tumble". Tumble is a type of swirl which occurs around a horizontal plane that intersects the cylinder bore axis rather than around the cylinder bore axis. That is, the charge that flows into the chamber is directed toward the side of the chamber opposite from the intake valve where it will be deflected downwardly by the cylinder bore and then back across the head of the piston and upwardly on the side where the charge is introduced. With conventional, three intake valve per cylinder engines, the center intake valve is disposed too far from the center of the cylinder bore axis to generate any tumble action.

It is, therefore, a still further object of this invention to provide an improved multi-valve, cylinder head arrangement including three intake valves wherein the center intake valve and its intake port are configured so as to permit the intake charge issuing from it to be directed across the cylinder to the opposite side.

When multiple valve cylinder heads are employed the valve area requires such a large recess in the cylinder head, particularly with five or more valves per cylinder, that squish action is not possible. As a result, it is normally difficult to obtain any significant squish action with conventional five valve per cylinder, cylinder heads.

It is, therefore, a still further object of this invention to provide an improved five valve per cylinder engine wherein squish action can be easily promoted.

SUMMARY OF THE INVENTION

All of the features of this invention are adapted to be embodied in a cylinder head and induction system for an internal combustion engine that comprises a cylinder head assembly defining three intake valves seats, all adapted to communicate with the same combustion chamber of the engine. Poppet valves cooperate with these valve seats for controlling the flow therethrough.

In accordance with one feature of the invention, at least one of the valve seats is of a different diameter than the other two of the valve seats and intake port means are formed in the cylinder head and terminate at each of the valve seats for delivering a charge to the associated combustion chamber. The intake valve seats, intake valves and intake port means are tuned so that each of the valve seats provides an intake flow that has optimum efficiency at a different engine speed.

In accordance with another feature of the invention, the intake valve seats are disposed so that at least two of the intake valve seats are considered as side intake valve seats and lie closer to a plane passing through the center of the combustion chamber than the other of the valve seats, which other valve seat comprises a center intake valve seat. A center intake port is formed in the cylinder head and terminates at the center intake valve seat. This center intake port is inclined at an acute angle to a lower sealing surface of the cylinder head and extends generally straight up to the center intake valve seat for directing a charge into the combustion chamber toward the plane.

In accordance with another feature of the invention, two of the intake valve seats are considered as side intake valve seats and these lie closer to a plane passing through the center of the combustion chamber than the other of the valve seats which comprises a center intake valve seat. In accordance with this feature of the invention, a plane passing through the center of the side intake valve seats will pass through the center intake valve seat.

DETAILED DESCRIPTION OF THE PREFERRED EMBODIMENTS OF THE INVENTION

Figure 1:
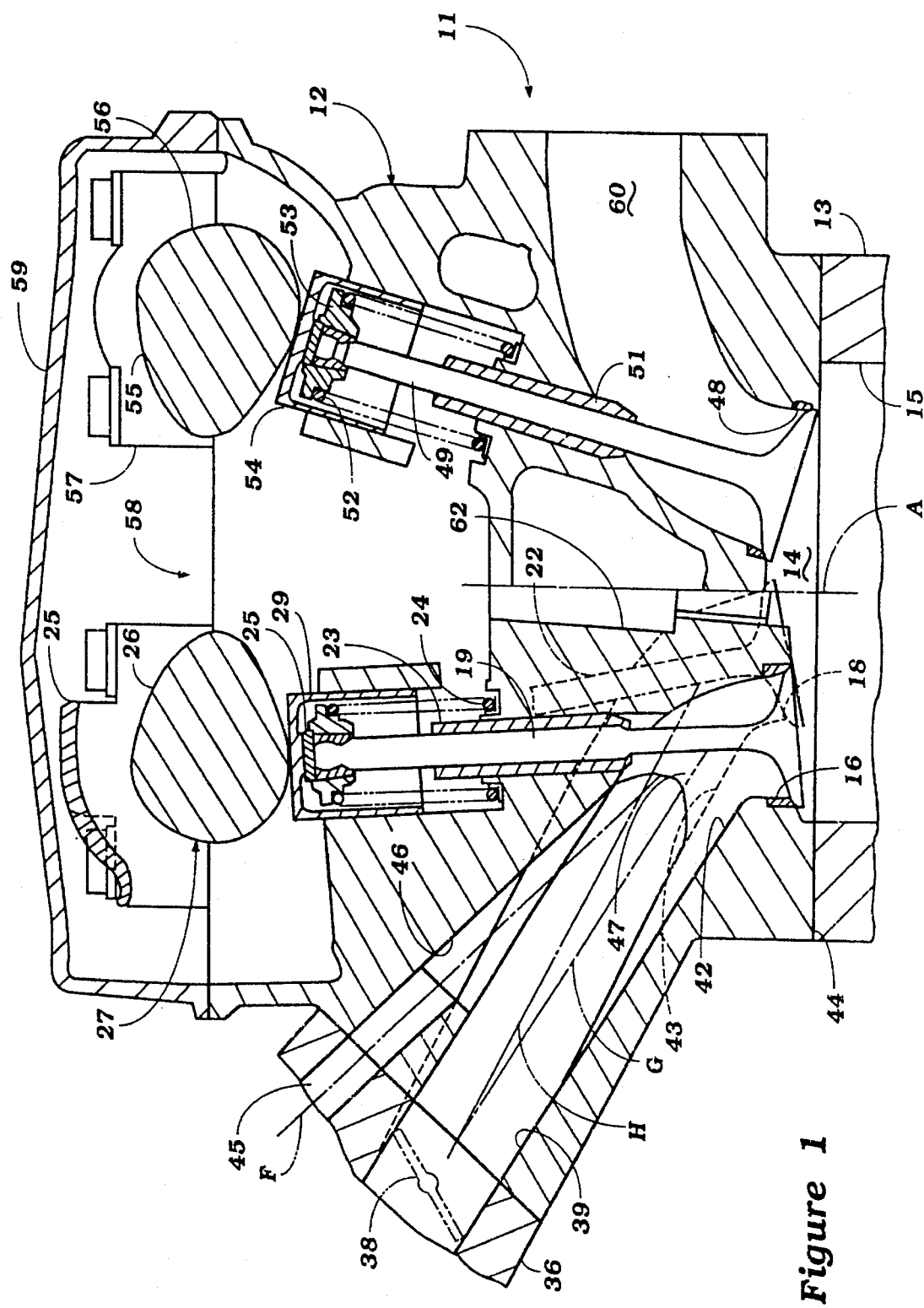
FIG. 1 is a cross sectional view taken through a cylinder head assembly constructed in accordance with a first embodiment of the invention and is taken generally along the line 1—1 of FIGS. 2 and 4.
Figure 2:
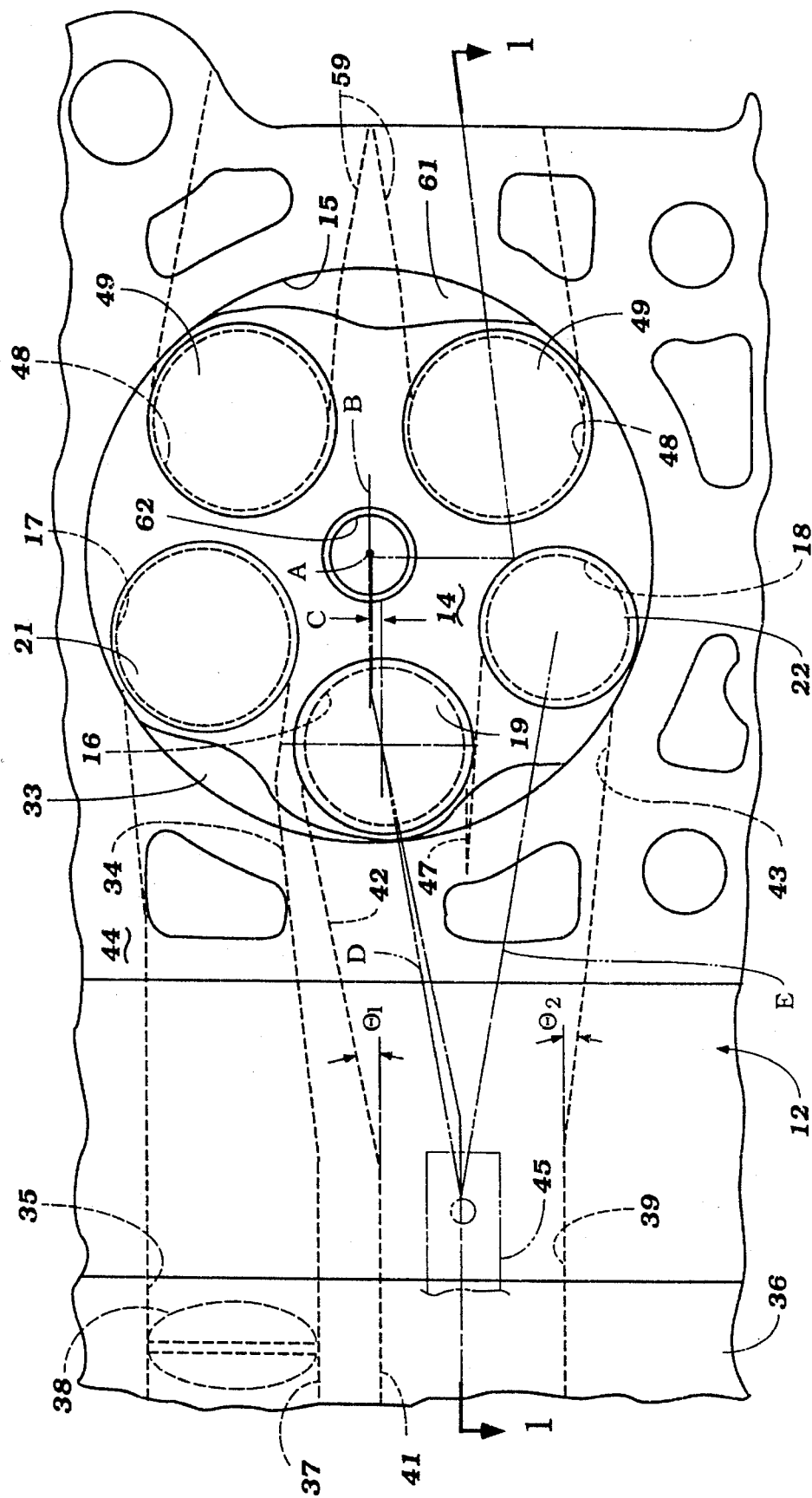
FIG. 2 is a partial bottom plan view of the cylinder head assembly.
Figure 3:
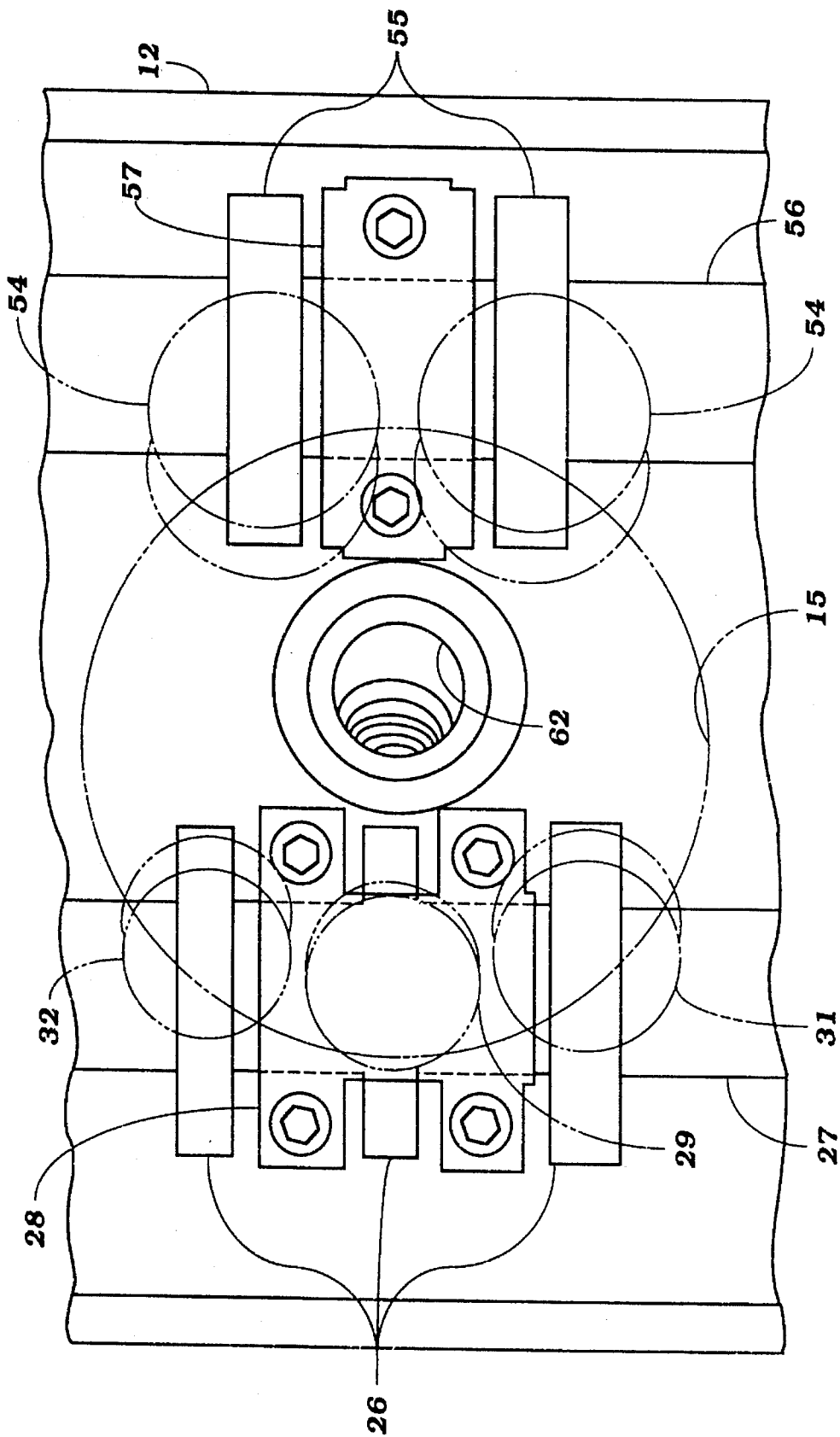
FIG. 3 is a top plan view of the cylinder head assembly with the cam cover removed and the tappet diameters shown in phantom along with the cylinder bore in this same fashion.

Referring now in detail to the drawings and initially to the embodiment of FIGS. 1 through 3, an internal combustion engine constructed in accordance with this embodiment is shown partially and is identified generally by the reference numeral 11. The engine 11 is depicted only in conjunction with a single cylinder of the engine and since the invention relates to the cylinder head assembly, indicated generally by the reference numeral 12, only the portion of the cylinder head assembly associated with a single cylinder bore is shown in the drawings. For any details of the engine 11 which are not depicted, they may be of any conventional type.

The cylinder head assembly 12 is affixed to a cylinder block in any known manner and has a combustion chamber recess 14 that is associated with a cylinder bore 15 of the cylinder block 13. Basically the left hand side of the cylinder head assembly 12 is the intake side and the recess 14 is formed with three intake valve seats comprised of a center intake valve seat 16 and side intake valve seats 17 and 18. The side intake valve seats 17 and 18 lie closer to a plane containing the cylinder bore axis A and extending parallel to the axis of rotation of the associated crankshaft (which plane appears also coincident with the cylinder bore axis A in FIG. 1) than the center intake valve seat 16. In fact, in all illustrated embodiments of the invention, the side intake valve seats 17 and 18 may extend over this center plane onto the exhaust side of the recess 14.

Poppet type intake valves 19, 21 and 22 are all mounted for reciprocation in the cylinder head assembly 12 along axes defined by valve guides, one of which appears in the Figures that associated with the center intake valve 19 and which is identified by the reference numeral 23. These intake valves 19, 21 and 22 are all urged toward their closed positions by coil compression springs 24 held in place by keeper retainer assemblies 25. These valves are opened by the respective lobes 26 of an intake camshaft, indicated generally by the reference numeral 27 and which is rotatably journalled in the cylinder head assembly 12 by one or more bearing caps 28 (FIG. 3). The reciprocal axes of the intake valves 19, 21 and 22 may be disposed as noted in the aforenoted U.S. Pat. No. 33,787. Briefly summarized, the axis of reciprocation of the side intake valves 21 and 22 are parallel to each other and at a greater acute angle to a plane containing the cylinder bore axis A than the axis of reciprocation of the center intake valve 19. The axes of reciprocation of the intake valves 19, 21 and 22 each lie in planes that are parallel to each other and perpendicular to the aforenoted plane containing the cylinder bore axis A.

In accordance with an important feature of this invention and in this particular embodiment, each of the intake valve seats 16, 17 and 18 and the respective heads of their associated intake valves 19, 21 and 22 are of a different size. In this embodiment, the center intake valve 19 and its associated valve seat 16 is larger than the side intake valve 22 and its intake valve seat 18 and smaller than the side intake valve 21 and its intake valve seat 17. This difference in sizing coupled with the valve actuation and porting arrangement permits each intake valve seat 16, 17 and 18 to be tuned so as to provide optimum charging performance for a different running speed of the engine 11.

This coupled with the large effective intake valve area permits not only good torque and performance at the various speeds for which the individual intake valves 19, 21 and 22 and the porting are tuned, but also permits the attainment of good torque and power at wide open throttle due to the large total effective valve area.

The intake valves 19, 21 and 22 are each operated from the cam lobes 26 through respective thimble tappets 29, 31, and 32 which have diameters that are different in the same proportion as the difference in the diameters of the heads of the valves 19, 21 and 22 and their respective valve seats 16, 17 and 18. The diameter of the valve springs 24 are also so interrelated. This relationship is true with all embodiments. That is, the intake valves that are the largest have the largest diameter thimble tappets and valve springs. Where the diameters of intake valves are the same, those same diameter intake valves are operated by tappets having the same diameters and the valve springs associated therewith also have the same diameter.

It should be noted that the center of the center intake valve seat 16 and the head of the intake valve 19 are offset by a distance C to one side of the cylinder bore axis A and a plane perpendicular to the aforenoted plane and identified by the broken line B in FIG. 2. This offsetting permits the use of the larger center intake valve 16 than the smaller side intake valve 22 to which side the center intake valve 19 is offset. This also permits the center intake valve 16 to be positioned somewhat closer to the cylinder bore axis A than if its center were directly on the line B and also permits a somewhat larger diameter for its head.

This offsetting also permits a squish area 33 to be formed between the intake valves 19, 21 and 22 on this side of the aforenoted plane containing the axis of the cylinder bore A so as to obtain some squish action.

The larger side intake valve 21 and its corresponding valve seat 17 is provided with a single intake passage 34 which extends through the side of the cylinder head to a single inlet opening 35 that is served by an intake manifold 36 in a manner which will be described. The intake passage 34 is generally straight and on a line which is substantially parallel to a corresponding axis of the intake passage associated with the other side intake valve seat 18 and which will be described later. The intake manifold 36 is provided with an intake passage 37 in which a flow controlling throttle valve 38 is positioned so as to normally preclude flow to the combustion chamber through the intake valve seat 17 and intake valve 21 except under high speed, high load performance. Hence, the intake passage 34, valve seat 17 and intake valve 21 are configured and tuned to provide maximum charging efficiency at a relatively high speed.

The center intake valve seat 16 and side intake valve seat 18 are served by a common intake passage of siamesed configuration, having an inlet portion 39 which is served by an intake passage 41 of the manifold 36. The manifold passages 37 and 41 may be served by a common plenum chamber to which air is admitted through an atmospheric air inlet in which a throttle valve (not shown) is provided, which throttle valve will control the speed of the engine. The throttle valve 38 may be opened either by an interconnected linkage with lost motion or by means of a vacuum servo motor or in any other well known manner as are employed in staged throttle valve mechanisms.

The intake passage 39 diverges into a pair of portions 42 and 43, respectively, which terminate at the valve seats 16 and 18. The passage portion 42 has a central axis G which is disposed at an acute angle to the lower seating face 44 of the cylinder head 12, which is sealed to the cylinder block 13 in a well known manner with an interposed head gasket. Because of this inclination of the intake port 42 and the fact that it extends in a straight line from the inlet opening 39 to an area immediately adjacent the valve seat 16 with only a small curved portion at this valve seat, the charge flowing into the combustion chamber will be directed toward the center plane A and the opposite side of the cylinder bore 15. Thus, even though the center intake valve 19 and its valve seat 16 are disposed at the extreme opposite side of the cylinder bore, there will still be a substantial tumble action generated because of the configuration.

The passageway 43 has its central axis H inclined at an acute angle to the lower sealing surface 44 and since the side intake valve 22 and its valve seat 18 are disposed closer to the cylinder bore center plane A, there will also be generated a substantial tumble action from this port as well as from the intake port 33 when it is flowing into the cylinder.

The intake manifold 36 and cylinder head 12 are formed with a bore 45 that receives a fuel injector (not shown). This bore 45 terminates in a recess 46 that bridges the manifold portion 39 and extends toward the sections 42 and 43. It should be noted that these sections 42 and 43 are separated by a very small wall 47 so that they communicate with each other through substantially all of their length. It should also be noted that the sides of the passages 42 and 43 are disposed at angles $\theta_1$ and $\theta_2$ to the common inlet opening portion 39 with the angle $\theta_1$ being greater than the angle $\theta_2$.

The fuel injector has a spray axis F that encompasses an arc shown between the lines D and E in FIG. 2, which arc intersects the center of the valve seats 16 and 18 and the center of the heads of the intake valves 19 and 22 so as to provide substantially equal fuel distribution between both intake passages. Although the intake passage 33 associated with the valve seat 17 has no fuel sprayed into it, the amount of fuel sprayed by the injector will be increased at the time when the throttle valve 38 is opened so that there will be adequate flow of fuel for the increased air flow to the combustion chamber. Also, because of the turbulence which is generated, the fuel/air mixture will be substantially homogeneous in the cylinder bore at the time of ignition.

Turning now to the exhaust side of the cylinder head 12, there are provided a pair of exhaust valve seats 48 which have the same diameter and which diameter may be the same as the diameter of the side intake valve seat 17. Popper type exhaust valves 49 are mounted in the cylinder head assembly 12 by means of valve guides 51.

The exhaust valves 49 are urged to their closed positions by coil compression springs 52 that cooperate with keeper retainer assemblies 53 affixed to the stems of the exhaust valves 51. The exhaust valves are provided with bucket type tappets 54 that are mounted in suitable bores formed in the cylinder head and which are operated by cam lobes 55 of an exhaust camshaft 56. The exhaust camshaft 56 is rotatably journalled in the cylinder head assembly 12 by means of bearing caps 57 that are suitably affixed to the cylinder head assembly 12. Hence, the valve train is contained within a cam cavity 58 which is closed by a cam cover 59 that is fixed to the cylinder head in a suitable manner. A pair of exhaust passages 60 extend from the exhaust valve seats 48 to exhaust ports formed in the outer side of the cylinder head assembly 12 which cooperate with a suitable exhaust manifold (not shown).

It should be noted that the positioning of the exhaust valves 49 and the exhaust valve seats 48 permits the formation of a squish area 61 on the exhaust side of the cylinder head around the recess 14 so as to further promote turbulence and improve combustion efficiency particularly at low speeds.

A spark plug well 62 is formed in the cylinder head assembly 12 and terminates in the recess 14 at a point so that the gap of tile spark plug will lie directly on the cylinder bore axis A. This spark plug is fired in any well known manner.

As may be readily seen from FIG. 1, the axis of rotation of the intake camshaft 27 is disposed inwardly of the outer peripheral edge of the cylinder bore 15 while the axis of rotation of the exhaust camshaft 56 is outside of this peripheral edge of the cylinder bore 15. This permits a more compact cylinder head assembly while, at the same time, offering accessibility of the spark plug through the spark plug well 62.

Figure 4:
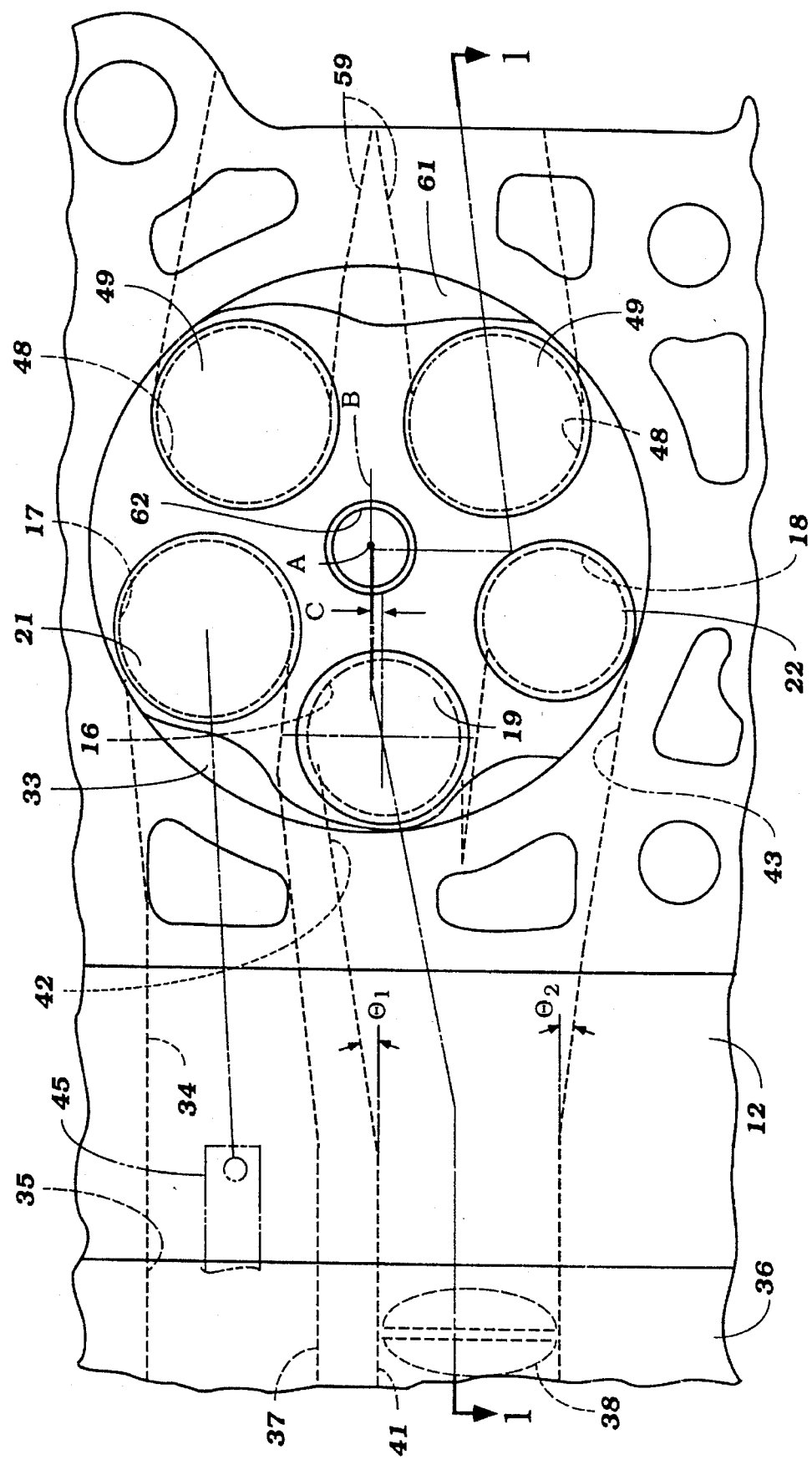
FIG. 4 is a bottom plan view of another embodiment of cylinder head assembly and is, in part, generally similar to the embodiment of FIG. 2.

FIG. 4 shows another embodiment of the invention which differs from the embodiments of FIGS. 1 through 3 only in the positioning of the flow controlling throttle valve 38 and the fuel injector which goes into the recess 45 as aforenoted. Because these are the only differences between this embodiment and that of FIGS. 1 through 3, all components of this embodiment which are substantially the same are identified by the same reference numerals and will be described again only insofar as is necessary to understand the construction and operation of this embodiment.

In this embodiment, the throttle valve 38 is positioned in the intake manifold passage 41 and thus the intake manifold passage 37 and cylinder head intake passage 34 form the primary intake passage for the engine 11 as opposed to the previously described embodiment. For this same reason, the fuel injector is mounted in the recess 45 of the manifold 36 and cylinder head 12 which intersects the primary intake passage 34 serving the valve seat 17. Aside from this difference, this embodiment is the same as that previously described and has the same advantages. Again, each of the intake valve seats 16, 17 and 18 and their associated passages are tuned to suit a different range of engine running conditions. However, since the passage 34 and valve seat 17 is for the primary passage, this is tuned primarily to serve a low engine speed requirement while the remaining passages are designed so as to provide better induction efficiency at higher engine speeds.

Figure 5:
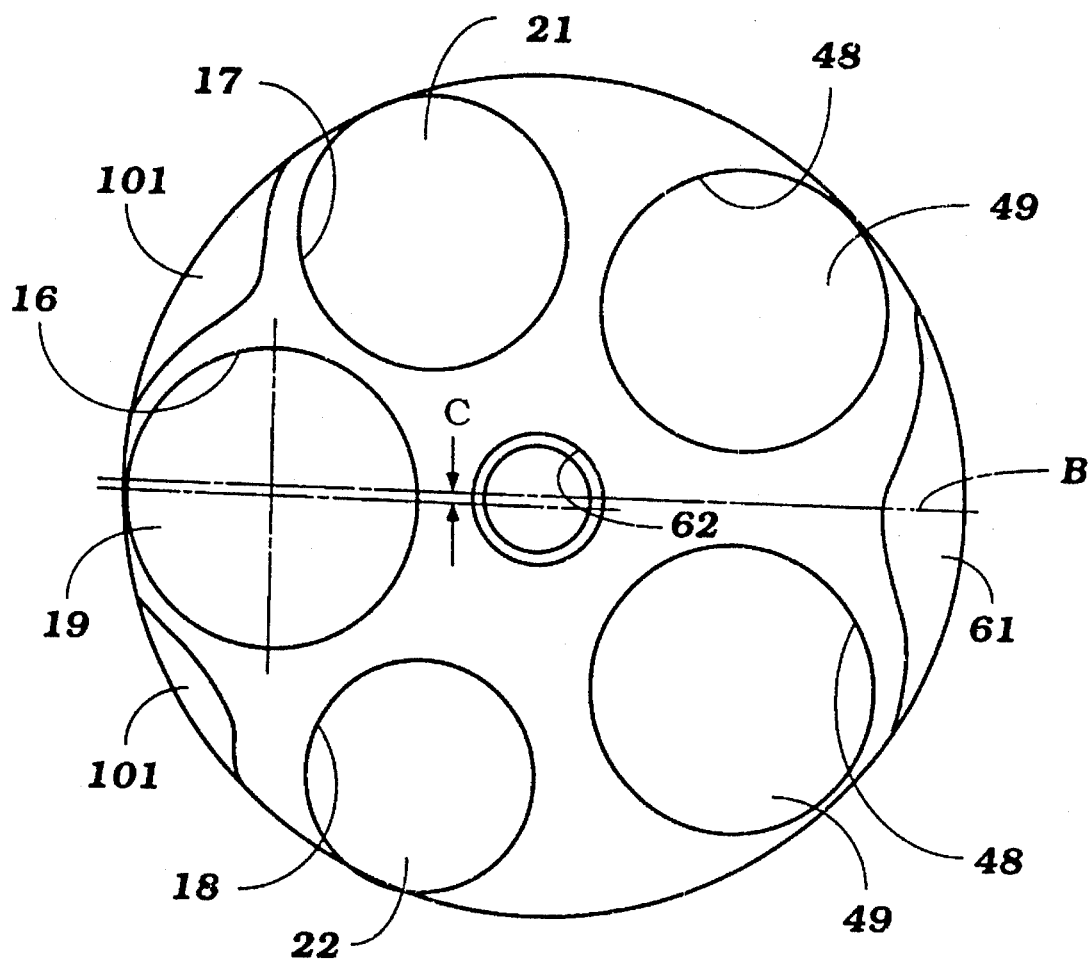
FIG. 5 is a bottom plan view of a cylinder head constructed in accordance with another embodiment of the invention and is in part similar to FIGS. 2 and 4, but only shows the portion of the cylinder head falling within the cylinder bore axis.

In the embodiments of the invention as thus far described, each of the intake valves has a different diameter with the center intake valve 19 having a diameter between those of the side intake valves 21 and 22. FIG. 5 is a view in part similar to FIGS. 2 and 4 of another embodiment of the invention, and in this embodiment the center intake valve 19 and its valve seat 16 are designed so as to have the largest diameter. The intake valve 21 and valve seat 17 in this embodiment have the next largest diameter while the side intake valve 22 and its valve seat 18 have the smallest diameter. This arrangement may be employed with either the porting and valve arrangement as shown in FIGS. 1 through 3 or that shown in FIG. 4.

Again in this embodiment, the center intake valve 19 and its associated valve seat 16 are offset by dimension C from the center plane B although this offsetting is somewhat less than that of the previously described embodiments. Also, since this center intake valve 19 and its seat 16 are of a larger diameter than the previously described embodiment, there are provided two smaller squish areas 101 each between the center intake valve 19 and one of the side intake valves 21 and 22.

In the embodiments of the invention as thus far described, each of the intake valves 19, 21 and 22 and their associated valve seats 16, 17 and 18 have a different diameter. Now will be described some embodiments wherein at least two of the intake valves have the same diameter. Since this is the only difference and since in each of these embodiments the porting, valving and fuel injection arrangements of either the embodiment of FIGS. 1 through 3 or the embodiment of FIG. 4 may be employed, only bottom plan views of the combustion chamber recess and valves are believed to be necessary to understand the construction and operation of these embodiments and the valves and valve seats and other components have been identified by the same reference numerals as already employed.

Figure 6:
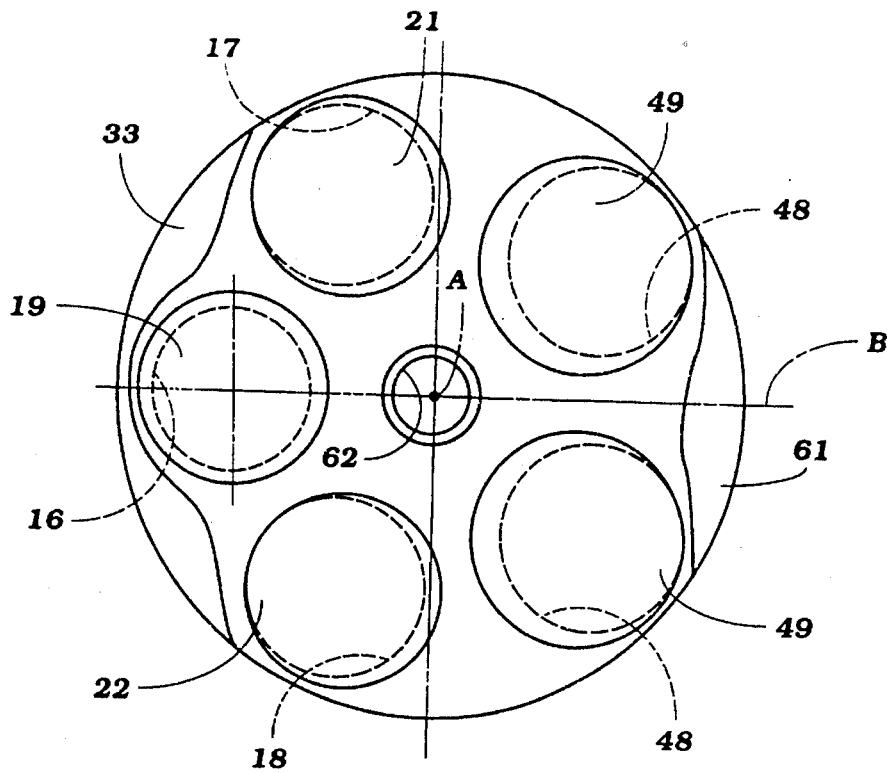
FIG. 6 is a bottom plan view, in part similar to FIG. 2, 4, and 5, and shows another embodiment of the invention.

In the embodiment of FIG. 6, the side intake valves 21 and 22 and their respective valve seats 17 and 18 are the same size and are larger than the center intake valve 19 and its valve seat 16. This permits the center intake valve 19 to be moved closer to the cylinder bore axis A and also permits the center of this port to be positioned directly on the plane B. This also permits the squish area 33 to be larger than with the previously described embodiments.

Figure 7:
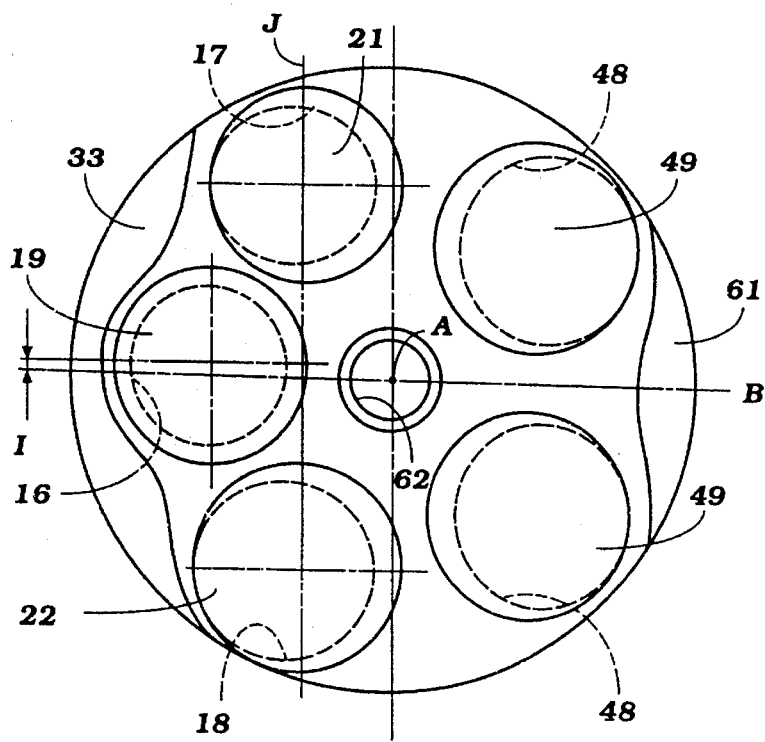
FIG. 7 is a bottom plan view, in part similar to FIG. 2, 4, 5 and 6, and shows a still further embodiment of the invention.

The embodiment of FIG. 7 employs an arrangement wherein the side intake valve 21 and its valve seat 17 are the same diameter as the center intake valve 19 and its valve seat 16. Hence, the remaining side intake valve 22 and its valve seat 18 are of a larger diameter. Because of this relationship, the center of center intake valve 19 and its valve seat 16 are offset by the distance I from the center plane B towards to the side intake valve 21. Also, this permits the positioning of the center intake valve 19 and its intake port 16 closer to the cylinder bore axis A. In fact, the center intake valve 19 may be positioned so that its head overlies a plane J passing through the center of the side intake valves 21 and 22 as seen in FIG. 7. Again, this construction also permits the squish area 33 to be enlarged.

Figure 8:
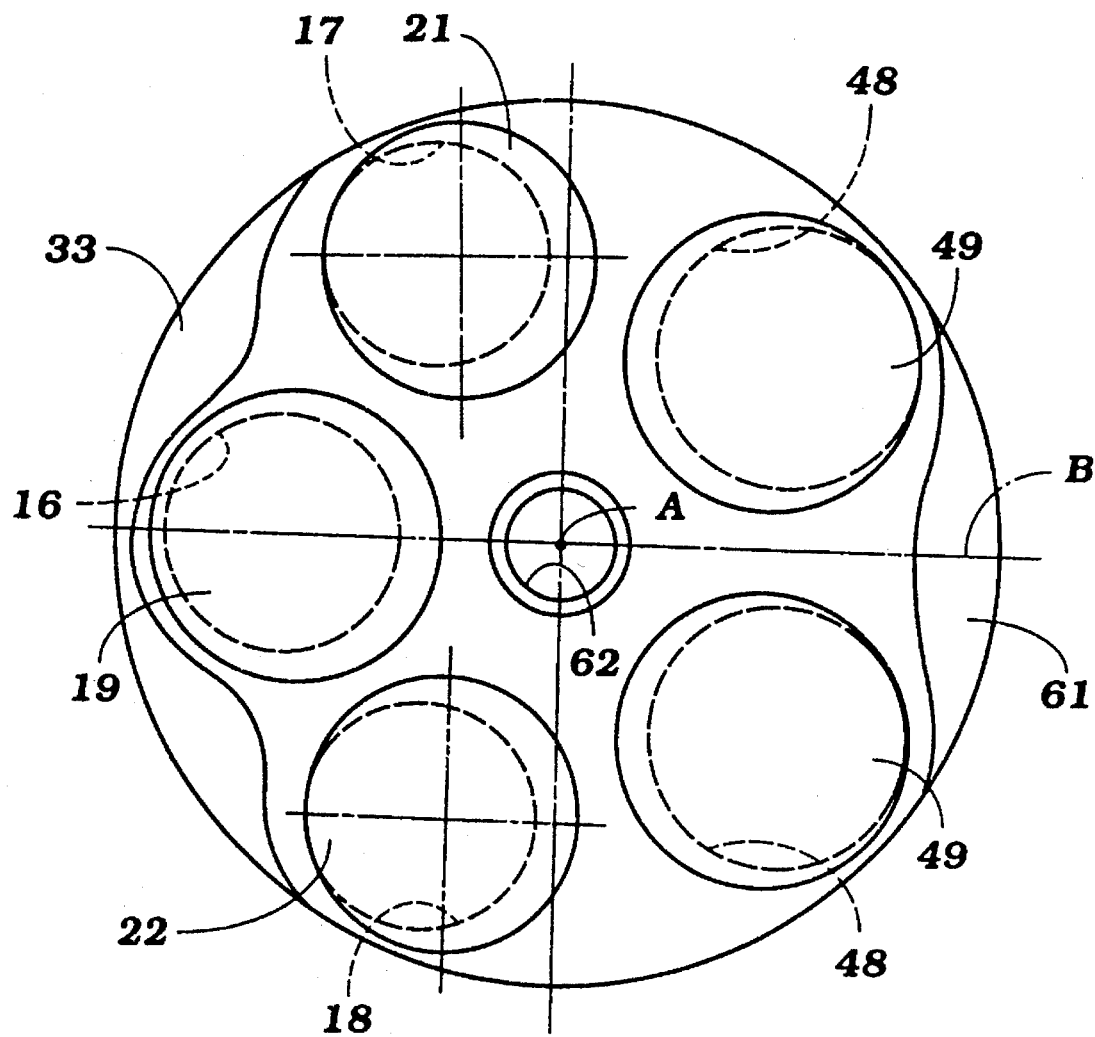
FIG. 8 is a bottom plan view, in part similar to FIGS. 2 and 4 through 7, and shows a still further embodiment of the invention.

FIG. 8 shows another embodiment which permits the center intake valve 19 and its valve seat 16 to be moved closer to the cylinder bore axis A and permits a larger squish area 33. This is done by making the side intake valves 21 and 22 and their respective valves seats 17 and 18 of the same diameter and smaller than the diameter of the center intake valve 19 and its valve seat 16.

In the embodiments of FIGS. 6, 7 and 8 wherein at least two of the valves and valve seats have the same diameter, it is still possible to tune the intake passages with those valves seats and the operation of the valves in such a way that each valve seat and its associated intake passage and valve is tuned to obtain maximum charging efficiency at a certain engine speed with all of these being tuned to accommodate different engine speeds. Alternatively, those valves which are paired in their induction systems, may be tuned together to suit the same speed. Also, although arrangements have been disclosed with paired or siamesed intake passages for two of the valves, each valve may operate with its own intake passage or all of the passages may be siamesed.

It should be readily apparent from the foregoing description that the described embodiments of the invention permit the use of a large intake valve area and, at the same time, permit tuning of the induction system for the engine so as to achieve good performance and good torque throughout the entire engine speed and load ranges. In addition, the construction permits the increase of turbulence in the combustion chamber at low speeds and low loads so as to improve the performance of the engine even under this condition, which is extremely difficult to obtain with high performance engines having large valve areas. Of course, the foregoing description is that of preferred embodiments of the invention and various changes and modifications may be made without departing from the spirit and scope of the invention, as defined by the appended claims.

I claim:

1. A cylinder head and induction system for an internal combustion engine having a cylinder head assembly defining three intake valve seats all adapted to communicate with the same combustion chamber of the engine, at least one of said valve seats being of a different diameter than the other two of the valve seats, three poppet valves supported for reciprocation in said cylinder head and each controlling the flow through a respective one of said valve seats, intake port means formed in said cylinder head and terminating at each of said valve seats for delivering a charge to the associated combustion chamber, said intake valve seats, said intake valves and said intake port means being tuned so that each of said valve seats provides an intake flow to the combustion chamber that has optimum effect at a different engine speed.

2. A cylinder head and induction system for an internal combustion engine as set forth in claim 1 wherein all of the valve seats have different diameters.

3. A cylinder head and induction system for an internal combustion engine as set forth in claim 1 wherein two of the valve seats have the same diameter.

4. A cylinder head and induction system for an internal combustion engine as set forth in claim 3 wherein two of the intake valve seats are disposed closer to a plane containing the center of the combustion chamber and comprise side intake valve seats and the remaining valve seat comprises a center intake valve seat and wherein the center intake valve seat and one of the side intake valve seats have the same diameter.

5. A cylinder head and induction system for an internal combustion engine as set forth in claim 3 wherein two of the intake valve seats are disposed closer to a plane containing the center of the combustion chamber and comprise side intake valve seats and the remaining valve seat comprises a center intake valve seat and wherein both of the side intake valve seats have the same diameter.

6. A cylinder head and induction system for an internal combustion engine as set forth in claim 1 wherein the intake port means comprises a siamese intake port having an inlet opening at one side of the cylinder head and terminating at a pair of the intake valve seats and a second intake port having an inlet opening formed at one side of the cylinder head and terminating at the remaining intake valve seat.

7. A cylinder head and induction system for an internal combustion engine as set forth in claim 6 wherein two of the intake valve seats are disposed closer to a plane containing the center of the combustion chamber and comprise side intake valve seats and the remaining valve seat comprises a center intake valve seat and wherein the siamesed passageway serves the center intake valve seat and one side intake valve seat.

8. A cylinder head and induction system for an internal combustion engine as set forth in claim 7 further including a control valve in one of said intake ports that is opened only at high engine speeds and loads so that that intake port only serves high engine speed conditions.

9. A cylinder head and induction system for an internal combustion engine as set forth in claim 8 further including means for injecting fuel into the other of the intake ports.

10. A cylinder head and induction system for an internal combustion engine as set forth in claim 9 wherein the fuel injector injects into the siamesed intake port.

11. A cylinder head and induction system for an internal combustion engine as set forth in claim 10 wherein the fuel injector is disposed so that its spray axis delivers substantially equal amounts of fuel to both of the valve seats served by the siamesed intake port.

12. A cylinder head and induction system for an internal combustion engine as set forth in claim 9 wherein the valve means is positioned in the non-siamesed intake port.

13. A cylinder head and induction system for an internal combustion engine as set forth in claim 1 wherein two of the intake valve seats are disposed closer to a plane containing the center of the combustion chamber and comprise side intake valve seats and the remaining valve seat comprises a center intake valve seat and wherein the intake port means serving the center intake valve seats is disposed at an acute angle to a sealing surface of the cylinder head so as to direct the charge flowing into the combustion chamber from the center intake valve seat toward the center of the combustion chamber to induce a tumble action to the charge entering the combustion chamber.

14. A cylinder head and induction system for an internal combustion engine as set forth in claim 13 wherein all of the valve seats have different diameters.

15. A cylinder head and induction system for an internal combustion engine as set forth in claim 13 wherein two of the valve seats have the same diameter.

16. A cylinder head and induction system for an internal combustion engine as set forth in claim 15 wherein the center intake valve seat and one of the side intake valve seats have the same diameter.

17. A cylinder head and induction system for an internal combustion engine as set forth in claim 15 wherein both of the side intake valves seats have the same diameter.

18. A cylinder head and induction system for an internal combustion engine as set forth in claim 13 wherein the intake port means comprises a siamese intake port having an inlet opening at one side of the cylinder head and terminating at a pair of the intake valve seats and a second intake port having an inlet opening formed at one side of the cylinder head and terminating at the remaining intake valve seat.

19. A cylinder head and induction system for an internal combustion engine as set forth in claim 18 wherein the siamesed passageway serves the center intake valve seat and one side intake valve seat.

20. A cylinder head and induction system for an internal combustion engine as set forth in claim 19 further including a control valve in one of said intake ports that is opened only at high engine speeds and loads so that that intake port only serves high engine speed conditions.

21. A cylinder head and induction system for an internal combustion engine as set forth in claim 20 further including means for injecting fuel into the other of the intake ports.

22. A cylinder head and induction system for an internal combustion engine as set forth in claim 21 wherein the fuel injector injects into the siamesed intake port.

23. A cylinder head and induction system for an internal combustion engine as set forth in claim 22 wherein the fuel injector is disposed so that its spray axis delivers substantially equal amounts of fuel to both of the valve seats served by the siamesed intake port.

24. A cylinder head and induction system for an internal combustion engine as set forth in claim 20 further including means for injecting fuel into the other of the intake ports.

25. A cylinder head and induction system for an internal combustion engine as set forth in claim 1 wherein two of the intake valve seats are disposed closer to a plane containing the center of the combustion chamber and comprise side intake valve seats and the remaining valve seat comprises a center intake valve seat and wherein the heads of the intake valves associated with the side intake valve seats extend over a plane containing the central axis of the combustion chamber.

26. A cylinder head and induction system for an internal combustion engine as set forth in claim 25 wherein the centers of the side intake valve seats lie on a common plane and the valve head associated with the center intake valve seat is intersected by said plane.

27. A cylinder head assembly for an internal combustion engine forming three intake valve seats for serving the same combustion chamber and spaced with two of said intake valve seats comprising side intake valve seats lying closer to a plane passing through the center of the combustion chamber than the other of said intake valve seats with said other intake valve seat comprising a center intake valve seat, a line passing through the center of side intake valve seats intersecting the head of a valve for controlling the flow through said center intake valve seat.

28. A cylinder head assembly for an internal combustion engine as set forth in claim 27 wherein the center intake valve seat has the same diameter as one of the side intake valve seats with the remaining side intake valve seat having a different diameter.

29. A cylinder head assembly for an internal combustion engine as set forth in claim 28 wherein the remaining side intake valve seat has a larger diameter than the center and one side intake valve seats.

\* \* \* \* \*